United States Patent [19]

Lush

[11] Patent Number: 5,755,178

[45] Date of Patent: May 26, 1998

[54] SQUIRREL FEEDER APPARATUS

[76] Inventor: Raymond Lush, 410 E. Main, Bloomfield, Nebr. 68178

[21] Appl. No.: 680,853

[22] Filed: Jul. 16, 1996

[51] Int. Cl.$^6$ .................................................. A01K 5/00
[52] U.S. Cl. ........................ 119/51.03; 182/92; 248/217.4
[58] Field of Search ............................ 119/51.03, 464, 119/466, 475, 477; 248/686, 217.4, 309.2; 182/92; 411/389

[56] References Cited

U.S. PATENT DOCUMENTS

| | | | |
|---|---|---|---|
| D. 119,499 | 3/1940 | Howard | 119/51.03 |
| 3,298,459 | 1/1967 | Bergsten | 182/92 |
| 3,537,429 | 11/1970 | Regan | 119/51.03 |
| 4,632,062 | 12/1986 | Hubbard | 119/51.03 |
| 4,856,953 | 8/1989 | Lin | 248/217.4 |

Primary Examiner—Michael J. Carone
Assistant Examiner—Yvonne R. Abbott
Attorney, Agent, or Firm—Zarley,McKee,Thomte, Voorhees & Sease; Dennis L. Thomte

[57] ABSTRACT

A wild game feeder bracket for supporting a block of animal feed on an upright member, the feeder bracket comprising, an elongated generally rigid U-shaped rod including a generally horizontally extended animal support leg having a base end and an opposite free end. A base end leg is connected to the base end of the animal support leg and extends upwardly therefrom. The base end leg has upper and lower ends. A free end leg is connected to the free end of the animal support leg and extends upwardly therefrom. The free end leg also have upper and lower ends. The free end leg comprises a means for supporting a block of animal feed thereon. A generally horizontal anchor leg is secured to the base leg opposite the animal support leg and directed oppositely thereof such that the feed block is supported in a spaced relation therefrom.

1 Claim, 2 Drawing Sheets

SQUIRREL FEEDER APPARATUS

BACKGROUND OF THE INVENTION

1. Technical Field

The present invention relates generally to the feeding of wild game. More specifically, it relates to a novel and simple apparatus and method for installing a squirrel feeder on a tree or other upright support. The present apparatus discloses a feeder which is easy to assemble and install on a tree or the like. The feeder apparatus disclosed comprises a generally U-shaped device with an anchor/securement leg attached to one end thereof. The apparatus is designed to be secured to a tree trunk or the like by screwing the securement arm into the trunk. A free end leg provides a means for receiving and supporting a block of animal feed thereon such that the block of feed is supported in a spaced relation from the upright support and from which the game may feed.

2. Description of the Prior Art

Conventional feeder devices are well known in the art. Such prior art devices consist primarily of feeders having a housing which is hung from a branch of a tree and into which the seed is placed. Such devices, while effective, are of considerably greater complexity and cost than the presently disclosed apparatus. Additionally, these devices are quite bulky, requiring significant shelf space for retail display thereof.

Consequently, it is a primary objective of the present invention to provide a feeder apparatus which is compact and easy to install on a vertical support member such as a tree trunk, post, wall, or the like.

An additional objective of the present invention is to provide a feeder comprising a generally horizontal transverse animal support and free and base end legs secured to opposite ends thereof.

An additional objective is to provide a feeder apparatus having a general U-shape with one of the vertical legs fashioned into a screw for removably receiving a block of animal feed such as an ear of corn.

An alternative objective is to provide a feeder wherein the feed support arm is fashioned with a tapper for slidably receiving the block of animal feed.

Another objective is to provide a feeder with an anchor/securement leg fastened to the other vertical leg and extended generally perpendicularly therefrom, and fashioned in the form of a screw for threadably securing the feeder apparatus to the vertical support.

Another objective is to provide a feeder apparatus wherein the feeder is fashioned from a single integral piece.

Another objective is to provide a feeder apparatus which may be fashioned from zinc plated steel in order to resist corrosion.

Another objective is to provide a feeder apparatus wherein the feeder is fashioned from a bar having a diameter of one-quarter to three-eighths inches.

Another objective is to provide a feeder apparatus having a generally U-shape wherein the transverse, horizontal member may be utilized to assist in the screwing of the feeder into the tree trunk and will also provide a horizontal member on which the squirrel may sit while feeding.

SUMMARY OF THE INVENTION

A wild game feeder bracket for supporting a block of animal feed on an upright member, the feeder bracket comprising an elongated generally rigid U-shaped rod including a generally horizontally extended animal support leg having a base end and an opposite free end. A base end leg is connected to the base end of the animal support leg and extends upwardly therefrom. The base end leg has upper and lower ends. A free end leg is connected to the free end of the animal support leg and extends upwardly therefrom. The free end leg also has upper and lower ends. The free end leg comprises a means for supporting a block of animal feed thereon. A generally horizontal anchor leg is secured to the base leg opposite the animal support leg and is directed oppositely therefrom such that the feed block is supported in a spaced relation therefrom.

BRIEF DESCRIPTION OF THE DRAWINGS

FIG. 4 is a perspective view illustrating the installation method of the feeder apparatus for installation on an upright support such as a tree trunk or the like.

DESCRIPTION OF THE PREFERRED EMBODIMENT

Figure 1:
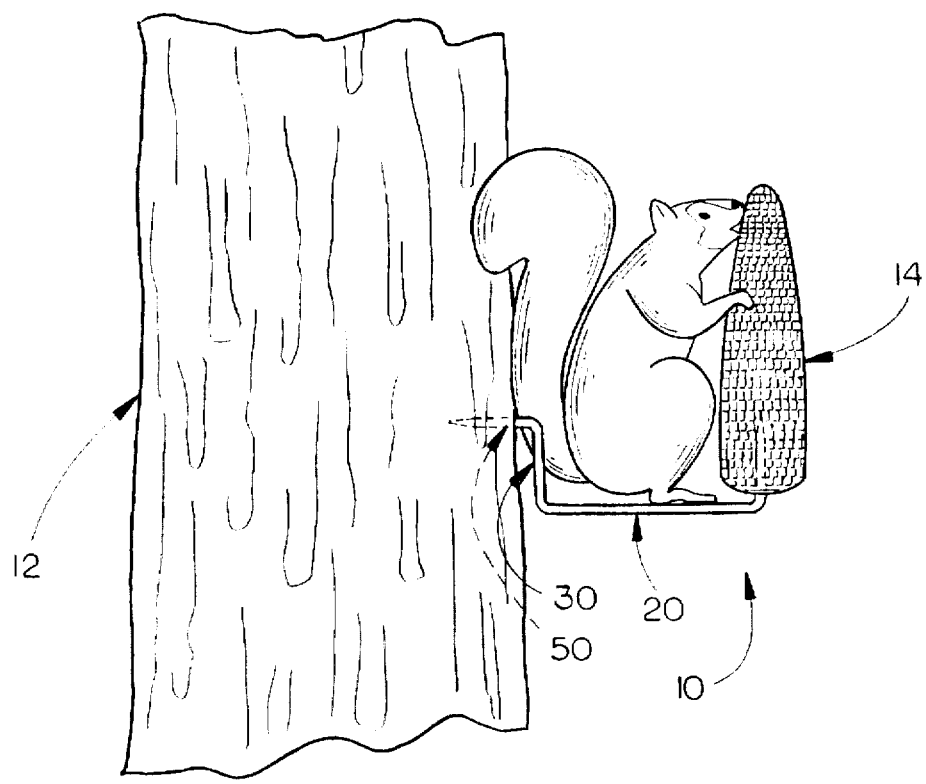
FIG. 1 is a foreshortened side view of the feeder apparatus installed in the trunk of a tree and supporting a squirrel on the transverse horizontal leg and feeding on an ear of corn supported on the free end leg of the apparatus.
Figure 2:
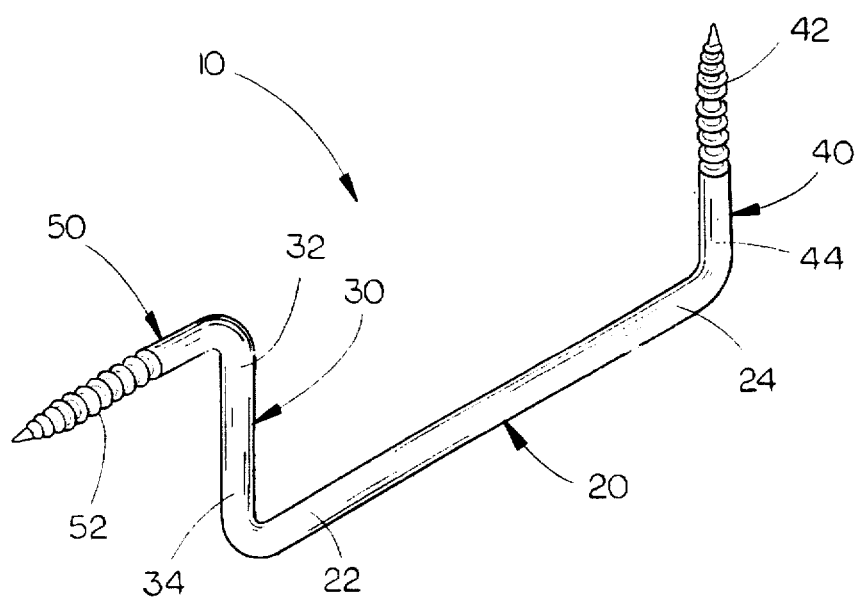
FIG. 2 is a perspective view of the feeder apparatus of the invention.

The operation and structure of the feeder apparatus of the present invention are best illustrated in FIGS. 1 and 2 respectively. With respect to the structure of the apparatus illustrated in FIG. 2, it will be seen that the feeder apparatus 10 comprises a generally U-shape defined by the transverse, horizontal animal support leg 20, the base end leg 30 and free end leg 40 attached to opposite ends thereof. Anchor support leg 50 is attached to base end leg 30 at the top 32 thereof and is used to install the feeder 10 on an upright support 12.

As shown in the figure, the base end leg 30 is secured to the transverse horizontal animal support leg 20 at the base end 22 thereof. Likewise, the free end leg 40 is secured to the transverse horizontal animal support leg 20 at free end 24 thereof. It will be observed from the figures, that both the base end leg 30 and free end leg 40 are constructed so as to be oriented generally perpendicular to the transverse, horizontal animal support leg 20 and, when installed, be generally vertically oriented as illustrated in FIG. 1. In one preferred embodiment (FIG. 2), the uppermost end of the free end leg 40 will be fitted with threads 42. Threads 42 provide one means for removably receiving a block of animal feed 14 such as an ear of corn.

Finally, as mentioned, it will be observed from FIG. 2 that generally horizontal anchor support leg 50 is secured to the upper end 32 of the base end leg 30. It will also be observed from the figure that the anchor support leg 50 is directed generally opposite of the transverse horizontal animal leg 20. In the preferred embodiment, the anchor support leg 50 will comprise threads 52 on the end thereof. In this preferred embodiment, threads 52 allow the feeder apparatus 10 to be screwed into the upright member 12, such as a tree trunk, as illustrated in FIG. 1.

As mentioned, FIG. 1 illustrates a preferred operation of the present invention. In this preferred operation, the feeder apparatus 10 would be screwed into an upright member 12 such as a tree trunk, using the threads 52 disposed on one end of the anchor leg 50. An animal feed block 14, such as an ear of corn, would be placed onto free end leg 40. In a preferred embodiment, free end leg 40 would have threads 42 disposed on the end thereof, allowing feed block 14 to be threaded thereon. Transverse, horizontal support leg 20 is adapted to extend outwardly of the upward support member 12, as illustrated in FIG. 1. Transverse horizontal support member 20 provides a means upon which the animal may set or perch during consumption of feed from feed block 14.

Figure 3:
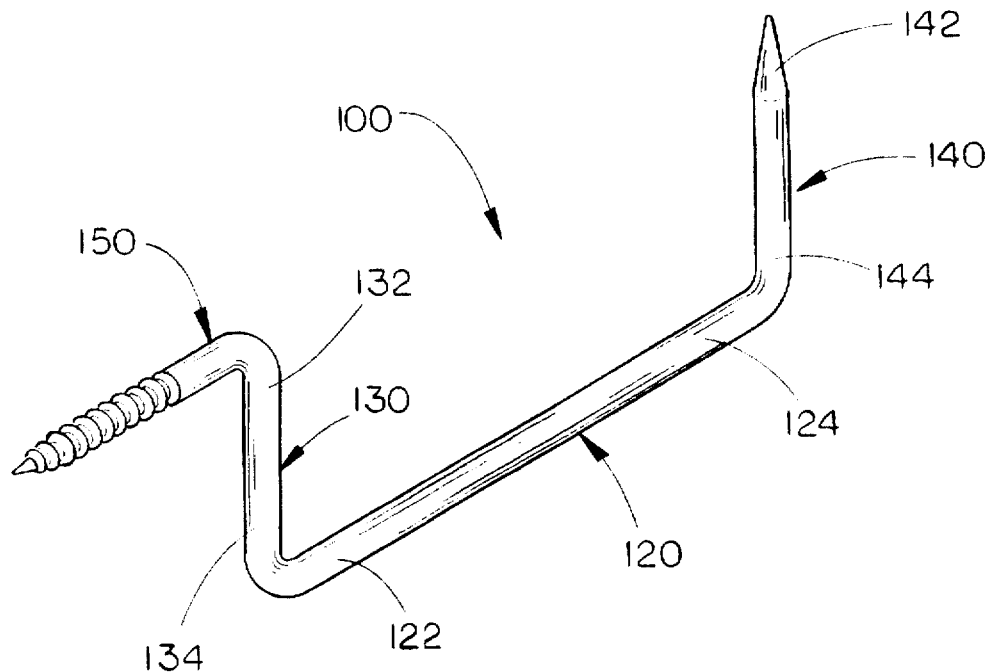
FIG. 3 is a perspective view of an alternate embodiment with a tapered tip on the free end leg for piercing a block of animal feed to be supported thereon.

FIG. 3 is a perspective view of an alternative embodiment 100 of the feeder apparatus. It will be observed from this figure, that the majority of the components between the preferred embodiment of FIGS. 1 and 2 are maintained in this embodiment. However, it will be noted that the threads 42 of the free end leg 40 have been removed and replaced with a tapered or pointed tip 142. It is envisioned that the pointed tip 142 of the alternative embodiment 100 of FIG. 3 might enjoy utility with some specific types of animal feed such as a more solid block of feed.

Figure 4:
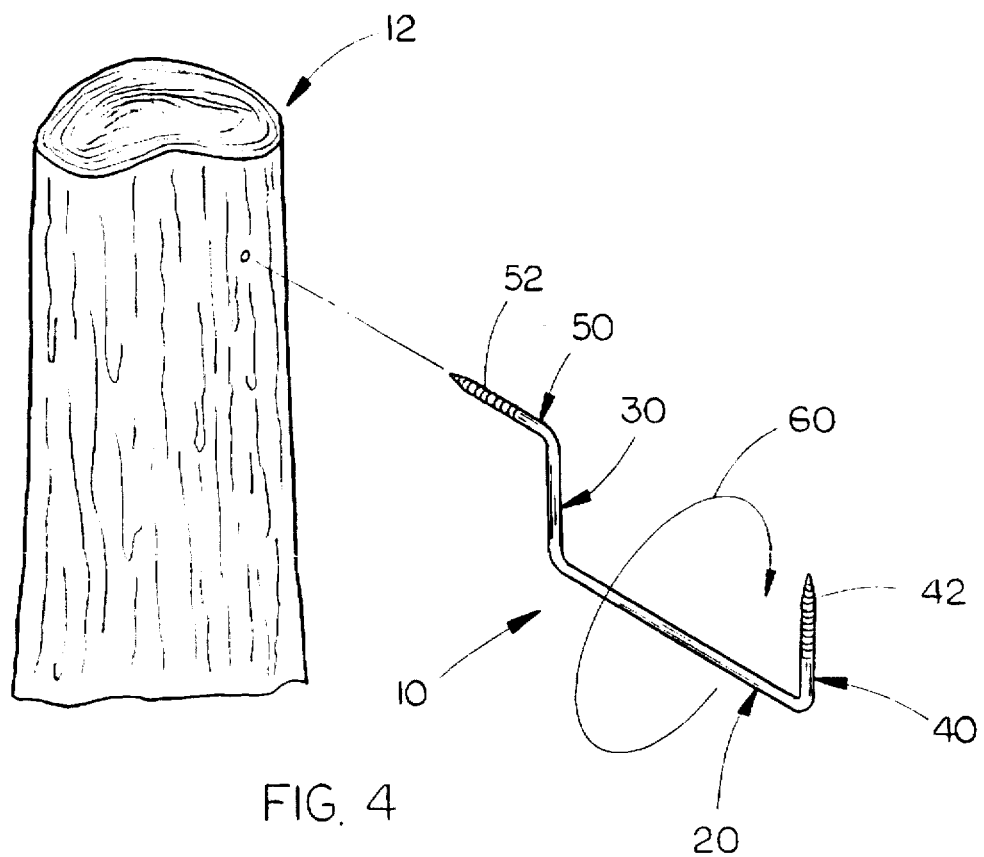

FIG. 4 is a perspective view illustrating the installation of the feeder apparatus 10 on an upright member 12. As seen in this figure, the anchor securement leg 50, and the threads 52 disposed on the end thereof, are adapted to be threadably received within the upright member 12. As shown in the figure, the generally U-shape of the feeder apparatus 10 and specifically transverse horizontal animal support leg 20 act as a crank to facilitate this threadable securement of the feeder by providing a grip or means for grasping the feeder apparatus and applying the rotation as indicated by the direction arrow 60 in the figure.

As mentioned above, in a preferred embodiment, the bird feeder apparatus 10 of the present invention would be constructed from a unitary steel bar having a diameter of between one quarter and three eighths inch diameter. It is also envisioned that the bar would preferably be coated with zinc or some similar substance so as to resist rust.

In a preferred method of constructing the feeder apparatus of the present invention, a standard, generally U-shaped bracket may be provided. One end of the bracket, comprising the threads, would be bent perpendicular to the adjacent member. The opposite end tip may be cut off and sharpened so as to provide a generally tapered point for receiving the feed block thereon. The feeder may then be screwed into the generally upright support structure such as a tree. An ear of corn or similar animal feed block would then be placed onto the end having the tapered point.

It is apparent that numerous other modifications and variations of the present invention are possible in view of the above teachings. For example, the means for securing the feeding apparatus to an upright member, may comprise nails, or brackets, etc. Additionally, the means for removably securing the animal feed block to the apparatus may similarly comprise a variety of means such as brackets and other attachment members.

Therefore, it is to be understood that the above description is in no way intended to limit the scope of protection of the claims and it is representative of only a couple of possible embodiments of the present invention. There has thus been shown and described an invention which accomplishes all of the stated objectives.

I claim:

1. A wild game feeder bracket for supporting a block of animal feed on an upright member, comprising:

an elongated, generally rigid U-shaped rod including,
- a transversely extended animal support leg, having opposite base and free ends, base end and free legs, connected to the base and free ends respectively of the animal support leg, said base and free end legs each having upper and lower ends and extending upwardly from said animal support leg; and
- a transversely extended anchor leg having a free end and an opposite end connected to the upper end of said base end leg and extended transversely therefrom in a direction generally opposite to said animal support leg;

said anchor leg comprising screw threads positioned on said anchor leg free end for threading said anchor leg free end into an upright member, and said upper end of said free end leg having a shape to facilitate insertion into a block of animal fee whereby, upon insertion of said free end leg into a block of animal feed, the block of animal feed is supported for consumption by wild game supported on said animal support leg, said upper end of said free end leg comprising screw threads for threadable insertion into a block of animal feed.

* * * * *